(12) United States Patent
Citti

(10) Patent No.: US 9,216,928 B2
(45) Date of Patent: Dec. 22, 2015

(54) REFRACTORY OBJECT INCLUDING BETA ALUMINA AND PROCESSES OF MAKING AND USING THE SAME

(75) Inventor: Olivier Citti, Wellesley, TX (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 209 days.

(21) Appl. No.: 13/447,046

(22) Filed: Apr. 13, 2012

(65) Prior Publication Data
US 2012/0263929 A1    Oct. 18, 2012

Related U.S. Application Data

(60) Provisional application No. 61/475,151, filed on Apr. 13, 2011.

(51) Int. Cl.
*C04B 35/10* (2006.01)
*C04B 35/64* (2006.01)
(Continued)

(52) U.S. Cl.
CPC ............. *C04B 35/113* (2013.01); *C03B 17/064* (2013.01); *C04B 35/101* (2013.01); *C04B 35/117* (2013.01); *C04B 35/6261* (2013.01); *C04B 41/009* (2013.01); *C04B 41/5031* (2013.01); *C04B 41/87* (2013.01); *C04B 2111/0025* (2013.01); *C04B 2111/00405* (2013.01); *C04B 2235/3201* (2013.01); *C04B 2235/3205* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01);
(Continued)

(58) Field of Classification Search
None
See application file for complete search history.

(56) References Cited

U.S. PATENT DOCUMENTS

| | | | |
|---|---|---|---|
| 3,378,385 | A | 4/1968 | McCreight et al. |
| 3,519,448 | A | 7/1970 | Alper et al. |

(Continued)

FOREIGN PATENT DOCUMENTS

| | | |
|---|---|---|
| CN | 1210838 A | 3/1999 |
| CN | 1835897 A | 9/2006 |

(Continued)

OTHER PUBLICATIONS

"Standard Test Methods for Apparent Porosity, Water Absorption, Apparent Specific Gravity, and Bulk Density of Burned Refractory Brick and Shapes by Boiling Water", ASTM International, Designation: C20-00, dated 2005, 3 pages.

(Continued)

*Primary Examiner* — Vera Katz
(74) *Attorney, Agent, or Firm* — Abel Law Group, LLP; Adam Keser

(57) ABSTRACT

A refractory object can include a beta alumina. In an embodiment, the refractory object is capable of being used in a glass fusion process. In another embodiment, the refractory object can have a total $Al_2O_3$ content of at least 10% by weight. Additionally, a Mg—Al oxide may not form along a surface of the refractory object when the surface is exposed to a molten glass including an Al—Si—Mg oxide. In a particular embodiment, a refractory object can be in the form of a glass overflow forming block used to form a glass object that includes an Al—Si—Mg oxide. When forming the glass object, the glass material contacts the beta alumina, and during the flowing of the glass material, a Mg—Al oxide does not form along the beta alumina at the surface.

13 Claims, 8 Drawing Sheets

(51) Int. Cl.

| | | |
|---|---|---|
| *B32B 7/02* | (2006.01) | |
| *B32B 5/00* | (2006.01) | |
| *B32B 9/00* | (2006.01) | |
| *C01F 7/02* | (2006.01) | |
| *C04B 35/113* | (2006.01) | |
| *C03B 17/06* | (2006.01) | |
| *C04B 35/101* | (2006.01) | |
| *C04B 35/117* | (2006.01) | |
| *C04B 35/626* | (2006.01) | |
| *C04B 41/00* | (2006.01) | |
| *C04B 41/50* | (2006.01) | |
| *C04B 41/87* | (2006.01) | |
| *C04B 111/00* | (2006.01) | |

(52) U.S. Cl.
CPC . C04B2235/3232 (2013.01); C04B 2235/3244 (2013.01); C04B 2235/3251 (2013.01); C04B 2235/3272 (2013.01); C04B 2235/3286 (2013.01); C04B 2235/3296 (2013.01); C04B 2235/3418 (2013.01); C04B 2235/5409 (2013.01); C04B 2235/5436 (2013.01); C04B 2235/5463 (2013.01); C04B 2235/656 (2013.01); C04B 2235/6567 (2013.01); C04B 2235/77 (2013.01); C04B 2235/80 (2013.01); C04B 2235/95 (2013.01); C04B 2235/9692 (2013.01); Y10T 428/24942 (2015.01); Y10T 428/26 (2015.01)

(56) References Cited

U.S. PATENT DOCUMENTS

| | | |
|---|---|---|
| 3,652,307 A | 3/1972 | Bakker |
| 3,808,013 A | 4/1974 | Manigault |
| 3,844,803 A | 10/1974 | Blanke et al. |
| 3,879,210 A | 4/1975 | LaBar |
| 3,953,563 A | 4/1976 | Kihlstedt et al. |
| 4,018,965 A | 4/1977 | Kerko et al. |
| 4,093,470 A | 6/1978 | Cherry |
| 4,117,055 A | 9/1978 | Alexanderson |
| 4,290,814 A | 9/1981 | Pavlica et al. |
| 4,595,665 A | 6/1986 | Takayama et al. |
| 4,735,926 A | 4/1988 | Ando et al. |
| 5,061,526 A | 10/1991 | Robyn et al. |
| 5,076,815 A | 12/1991 | Kunz et al. |
| 5,137,853 A | 8/1992 | Ichikawa et al. |
| 5,322,826 A | 6/1994 | Becker et al. |
| 5,326,512 A | 7/1994 | Stillwagon et al. |
| 5,403,795 A | 4/1995 | Koyama et al. |
| 5,733,830 A | 3/1998 | Endo et al. |
| 5,795,363 A | 8/1998 | Pecoraro et al. |
| 5,830,819 A | 11/1998 | Shikata et al. |
| 5,856,254 A | 1/1999 | Feige et al. |
| 6,054,186 A | 4/2000 | Bonsall, III |
| 6,077,801 A | 6/2000 | Zanoli et al. |
| 6,117,807 A | 9/2000 | Virkar et al. |
| 6,143,678 A | 11/2000 | Yamamoto et al. |
| 6,158,248 A | 12/2000 | Beppu |
| 6,159,885 A | 12/2000 | Mizuno et al. |
| 6,362,120 B1 | 3/2002 | Fukushima |
| 6,383,963 B1 | 5/2002 | Yamamoto et al. |
| 6,812,177 B2 | 11/2004 | Ishino |
| 7,148,167 B2 | 12/2006 | Shikata et al. |
| 7,335,617 B2 | 2/2008 | Boussant-Roux et al. |
| 7,648,732 B2 | 1/2010 | Ott et al. |
| 7,767,292 B2 | 8/2010 | Djuricic et al. |
| 7,939,458 B2 | 5/2011 | Nakamura et al. |
| 8,092,928 B2 | 1/2012 | Schofalvi et al. |
| 8,138,109 B2 | 3/2012 | Takenami et al. |
| 8,187,990 B2 | 5/2012 | Avedikian et al. |
| 2001/0019992 A1 | 9/2001 | Gaubil et al. |
| 2002/0103070 A1 | 8/2002 | Toshihiro |
| 2002/0172871 A1* | 11/2002 | Schucker ............. 429/304 |
| 2003/0078156 A1 | 4/2003 | Lowden |
| 2003/0109372 A1 | 6/2003 | Hasegawa et al. |
| 2003/0110804 A1 | 6/2003 | Fenn et al. |
| 2005/0186469 A1* | 8/2005 | De Jonghe et al. ....... 429/137 |
| 2006/0293162 A1 | 12/2006 | Ellison |
| 2007/0015655 A1 | 1/2007 | Avedikian et al. |
| 2007/0154762 A1* | 7/2007 | Schucker ............. 429/33 |
| 2007/0203013 A1 | 8/2007 | Harmuth |
| 2008/0047300 A1 | 2/2008 | Rhoads |
| 2008/0269042 A1 | 10/2008 | Carty |
| 2009/0062106 A1 | 3/2009 | Avedikian et al. |
| 2009/0131241 A1 | 5/2009 | Godard et al. |
| 2009/0233784 A1 | 9/2009 | Schofalvi et al. |
| 2010/0068492 A1 | 3/2010 | Boussant-Roux et al. |
| 2010/0084016 A1 | 4/2010 | Aitken et al. |
| 2010/0087307 A1 | 4/2010 | Murata et al. |
| 2010/0089098 A1 | 4/2010 | Citti et al. |
| 2010/0151232 A1 | 6/2010 | Cabodi et al. |
| 2010/0159226 A1 | 6/2010 | Suchanek et al. |
| 2010/0179051 A1 | 7/2010 | Citti et al. |
| 2010/0212359 A1 | 8/2010 | Godard et al. |
| 2010/0251774 A1 | 10/2010 | Peterson |
| 2010/0298109 A1 | 11/2010 | Takenami et al. |
| 2011/0021340 A1 | 1/2011 | Schofalvi et al. |
| 2011/0236743 A1* | 9/2011 | Kumar et al. ............. 429/144 |
| 2011/0251042 A1 | 10/2011 | Araki et al. |
| 2011/0283742 A1 | 11/2011 | Alasia |
| 2012/0006059 A1 | 1/2012 | Dejneka et al. |
| 2012/0006069 A1 | 1/2012 | Kim et al. |
| 2012/0096822 A1 | 4/2012 | Raffy |
| 2012/0164540 A1* | 6/2012 | Park et al. ............. 429/320 |
| 2012/0180528 A1 | 7/2012 | Ketcham et al. |
| 2012/0227445 A1 | 9/2012 | Citti et al. |
| 2012/0260696 A1 | 10/2012 | Citti et al. |
| 2012/0263929 A1 | 10/2012 | Citti |
| 2013/0217563 A1 | 8/2013 | Citti et al. |

FOREIGN PATENT DOCUMENTS

| | | |
|---|---|---|
| CN | 101124173 A | 2/2008 |
| CN | 101367665 A | 2/2009 |
| CN | 101687711 A | 3/2010 |
| CN | 101774749 A | 7/2010 |
| DE | 3029784 A1 | 2/1981 |
| DE | 3725170 A1 | 2/1989 |
| DE | 112006003321 A5 | 10/2008 |
| EP | 0010834 A1 | 5/1980 |
| EP | 0701979 A1 | 3/1996 |
| EP | 0818243 A1 | 1/1998 |
| EP | 0850897 A1 | 7/1998 |
| EP | 0887324 A1 | 12/1998 |
| EP | 1288177 A1 | 3/2003 |
| EP | 2407441 A2 | 1/2012 |
| FR | 2392946 | 12/1978 |
| GB | 454599 A * | 10/1936 |
| GB | 618248 A | 2/1949 |
| GB | 960384 A | 6/1964 |
| GB | 1072536 A | 6/1967 |
| GB | 1244895 A | 6/1971 |
| GB | 1531167 A | 11/1978 |
| GB | 2262522 A | 6/1993 |
| JP | 52129714 A | 10/1977 |
| JP | 5669270 | 6/1981 |
| JP | 56-92177 A | 7/1981 |
| JP | 60055459 B | 12/1985 |
| JP | 2069363 A | 3/1990 |
| JP | 2092871 A | 4/1990 |
| JP | 2225369 A | 9/1990 |
| JP | H03-83849 A | 4/1991 |
| JP | H04-310570 A | 11/1992 |
| JP | 5301762 A | 11/1993 |
| JP | 06-144922 A | 5/1994 |
| JP | H08-048561 A | 2/1996 |
| JP | H08-175878 | 7/1996 |
| JP | 9030859 A | 2/1997 |
| JP | 9328357 A | 12/1997 |
| JP | 10218676 | 8/1998 |

(56) References Cited

FOREIGN PATENT DOCUMENTS

| | | |
|---|---|---|
| JP | H10-218676 A | 8/1998 |
| JP | 11171639 A | 6/1999 |
| JP | 2942061 B2 | 8/1999 |
| JP | 11-343174 A | 12/1999 |
| JP | 2000-111024 A | 4/2000 |
| JP | 2003-081653 A | 3/2003 |
| JP | 2003137671 A | 5/2003 |
| JP | 2004-026561 A | 1/2004 |
| JP | 3489588 B2 | 1/2004 |
| JP | 2004-203691 A | 7/2004 |
| JP | 2005512926 A | 5/2005 |
| JP | 2007-504088 A | 3/2007 |
| JP | 2007-197303 A | 8/2007 |
| JP | 2008-501609 A | 1/2008 |
| JP | 2009-158576 A | 7/2009 |
| JP | 2011-088759 A | 5/2011 |
| JP | 2012-020925 A | 2/2012 |
| RU | 1796601 | 2/1993 |
| RU | 2039025 C1 | 7/1995 |
| RU | 2140964 C1 * | 11/1999 |
| SU | 1054331 A1 | 11/1983 |
| SU | 1470731 | 4/1989 |
| SU | 1675279 A1 | 9/1991 |
| TW | 200946467 A | 11/2009 |
| TW | I332487 B | 11/2010 |
| WO | 9908804 A1 | 2/1999 |
| WO | 01-92183 A1 | 12/2001 |
| WO | 2005/023726 A1 | 3/2005 |
| WO | 2006/057669 A2 | 6/2006 |
| WO | 2009/007933 A1 | 1/2009 |
| WO | 2009/020011 A1 | 2/2009 |
| WO | 2009096550 A | 8/2009 |
| WO | 2010071892 A2 | 6/2010 |
| WO | 2010073195 A1 | 7/2010 |
| WO | 2011022639 A2 | 2/2011 |
| WO | 2011055642 A | 5/2011 |

OTHER PUBLICATIONS

Trushkova et al., "Glass for Ion-Exchange Strengthening", Plenum Publishing Company (1982), UDC 666.1.053.65, <http://resources.metapress.com/pdf-preview.axd?code=w1142mnnt5u61410&size=largest>, translated from Steklo i Keramika, No. 2, p. 13, dated Feb. 1982, 1 page.

Felsche, J. et al., "The alkali problem in the crystal structure of beta alumina," Zeitschrift fur Kristallagraphie, Bd. 127, pp. 94-100, Jan. 22, 1968.

NIST Property Data Summaries, http://www.ceramics.nist.govlsrd/summary/ftgbetal.htm, 2 pages.

The International Search Report and the Written Opinion received from the International Searching Authority (ISA/KR) for International Application No. PCT/US2012/033409, dated Mar. 4, 2013, 13 pages.

International Search Report from PCT/US2012/031689 mailed Oct. 25, 2012, 1 page.

International Search Report from PCT/US2012/028633 mailed Oct. 18, 2012, 1 page.

International Search Report from PCT/US2013/021086 mailed Jun. 17, 2013, 1 page.

Search Results, 7 pages.

Yujuan, Zhang, "The Effects of Ta2O5 and MgO Additives on Microstructure and Mechanical Properties of Ultra-pure Alumina Ceramics," Journal of Wuhan Institute of Building Materials, Dec. 31, 1983, Issue 1, pp. 27-42.

"The Saint=Gobain SEFPRO Unshaped Product Range 1991-2009", Jan. 1, 2009, pp. 1-7, XP002731397 <www.sefpro.com/uploaded files/>.

Davis Jr., et al., "What You Should Know About Fusion-Cast Refractories", Glass Industry, Jan. 1, 1989, vol. 70, No. 9, pp. 14-16.

Wolfgang Schulle, "Feuerfeste Werkstoffe", Deutscher Verlag fur Grundstoffindustrie, Liebzig, Jan. 1, 1990, 2 pages.

G. Routschka, et al., "Praxisbuch Feuerfeste Werkstoffe, 5., Auflage," Vulkan Verlag, Esse, DE, Jan. 1, 2011, 24 pages.

A.A. Litvakovsky, "Fused Cast Refractories", Moscow, Gosstroyizdat, 1959, (I), p. 30-31, Monofrax MH and Monfrax H.

* cited by examiner

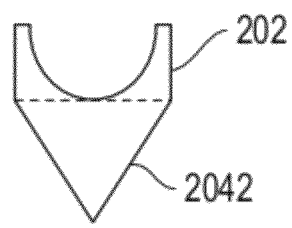
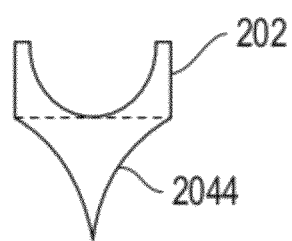
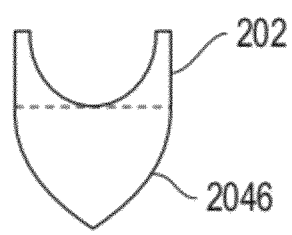
FIG. 3

| Sample | Beta-Al2O3 Source | Milling Conditions | Sintering Temp (C) | Sinter Environment | ZnO (wt%) | MgO (wt%) | Approx. Porosity (vol%) | Bulk Density (g/cc) | Alpha-Al2O3 (wt%) | Beta-Al2O3 (wt%) |
|---|---|---|---|---|---|---|---|---|---|---|
| 1 | JM | A | 1600 | Enclosed with JM | - | - | 24.37 | 2.72 | | |
| 2 | JM | A | 1600 | Open air | - | - | 22.96 | 2.68 | | |
| 3 | JM | A + B | 1600 | Enclosed with JM | - | - | 22.22 | 2.72 | | |
| 4 | JM | A + B | 1600 | Open air | - | - | 24.28 | 2.75 | 57 | 43 |
| 5 | JM | A + B | 1600 | Enclosed with JM | - | 1 | 23.91 | 2.64 | | |
| 6 | JM | A + B | 1600 | Open air | - | 1 | | | | |
| 7 | JM | A + B | 1600 | Enclosed with JM | 1 | - | 23.09 | 2.71 | | |
| 8 | JM | A + B | 1600 | Open air | 1 | - | 22.68 | 2.68 | | |
| 9 | JM | A + B + C | 1600 | Enclosed with JM | - | - | 0.36 | 3.48 | 48 | 52 |
| 10 | JM | A + B + C | 1600 | Open air | - | - | 0.72 | 3.47 | 46 | 54 |
| 11 | JM | A + B + C | 1700 | Enclosed with JM | - | - | 4.35 | 3.39 | | |
| 12 | JM | A + B + C | 1700 | Open air | - | - | 5.65 | 3.39 | | |
| 13 | JM | A + B + C | 1600 | Enclosed with JM | - | 1 | 0.00 | 3.47 | | |
| 13 (Retest of density and porosity) | JM | A + B + C | 1600 | Enclosed with JM | - | 1 | 0.04 | 3.46 | | |
| 14 | JM | A + B + C | 1600 | Open air | - | 1 | 0.00 | 3.46 | | |
| 14 (Retest of density and porosity) | JM | A + B + C | 1600 | Open air | - | 1 | 0.00 | 3.47 | 43 | 57 |
| 15 | JM | A + B + C | 1700 | Enclosed with JM | - | 1 | 1.54 | 3.37 | | |
| 16 | JM | A + B + C | 1700 | Open air | - | 1 | 1.75 | 3.37 | | |
| 17 | JM | A + B + C | 1600 | Enclosed with JM | 1 | - | 0.38 | 3.50 | 46 | 54 |
| 18 | JM | A + B + C | 1600 | Open air | 1 | - | 0.44 | 3.43 | 45 | 55 |
| 19 | JM | A + B + C | 1700 | Enclosed with JM | 1 | - | 5.14 | 3.38 | | |
| 20 | JM | A + B + C | 1700 | Open air | 1 | - | 5.16 | 3.38 | | |
| 21 | JH | A + B + C | 1600 | Open air | - | 1 | 0.39 | 3.23 | | |
| 22 | JH | A + B + C | 1600 | Open air | - | - | 4.00 | 3.05 | | |
| 23 | JH | A + B + C | 1600 | Open air | 1 | - | 0.07 | 3.19 | | |

Milling Conditions: A - Al2O3 Dry; B - ZrO2 Dry; C - Al2O3 Wet

FIG. 12

REFRACTORY OBJECT INCLUDING BETA ALUMINA AND PROCESSES OF MAKING AND USING THE SAME

PRIORITY CLAIM AND CROSS-REFERENCE TO RELATED APPLICATION

This application claims priority to U.S. Provisional Patent Application No. 61/475,151 filed on Apr. 13, 2011, and entitled "Refractory Object Including Beta Alumina and Processes of Making and Using the Same," and naming Olivier Citti as an inventor, which is incorporated by reference herein in its entirety.

FIELD OF THE DISCLOSURE

This disclosure, in general, relates to a refractory object including beta alumina and processes of making and using the same.

BACKGROUND

Alkali alumino-silicate glasses that contain magnesium oxide are being used in applications where mechanical performance is more important. These glasses can be formed using a fusion draw process, where liquid glass flows over the lips of a glass overflow forming block made of zircon material and fuses at the bottom of the glass overflow forming block to form a glass sheet. In contact with alkali alumino-silicate glasses, zircon ($ZrSiO_4$) dissociates into $ZrO_2$ and $SiO_2$ at temperatures close to the glass forming temperature. The higher $SiO_2$ content may lead to formation of gas bubbles as it dissolves into the glass. $ZrO_2$ can create $ZrO_2$ solid nodules at the interface that can then be released into the glass forming defects. Accordingly, the glass overflow forming block has a reduced lifetime as zircon material erodes from the body of the glass overflow forming block while the glass that is manufactured is contaminated with an undesired element that disadvantageously affects its properties.

BRIEF DESCRIPTION OF THE DRAWINGS

The present disclosure may be better understood, and its numerous features and advantages made apparent to those skilled in the art by referencing the accompanying drawings.

FIG. 3 is a diagram illustrating a particular set of various cross-sectional perspectives of glass overflow forming blocks.

FIG. 12 is a table that includes data on composition, physical properties and corrosion properties for refractory objects formed using different milling and sintering conditions.

The use of the same reference symbols in different drawings indicates similar or identical items.

DETAILED DESCRIPTION

Figure 1:
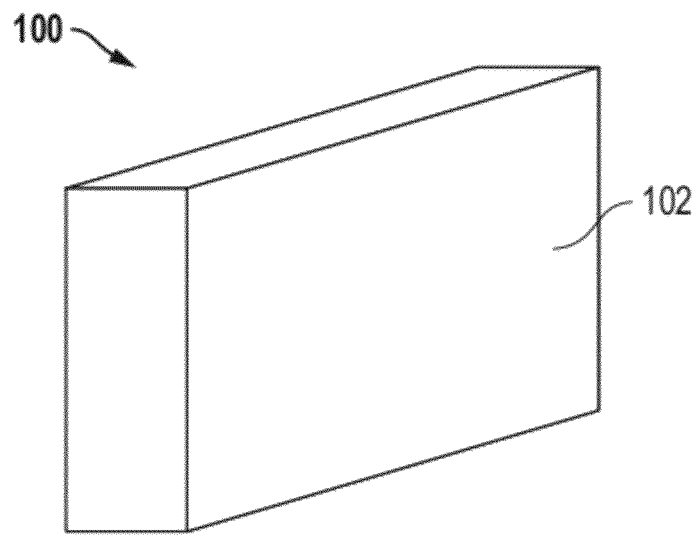
FIG. 1 is a diagram illustrating a particular embodiment of a refractory object.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

The term "alumina" is intended to mean $Al_2O_3$, a compound that can be expressed as having $Al_2O_3$ as a constituent group within the molecular formula of such compound, or any combination thereof. An example of alumina includes alpha-$Al_2O_3$, beta alumina, mullite, sodium aluminate, another suitable $Al_2O_3$—based compound, or any combination thereof.

Unless explicitly stated to the contrary, the term "beta alumina" refers to any individual beta alumina compound, all or any subset of individual beta alumina compounds, or any combination of beta alumina compounds (for example, a mixture of beta alumina compounds). Exemplary beta alumina compounds are described later in this specification.

The term "averaged," when referring to a value, is intended to mean an average, a geometric mean, or a median value.

Group numbers corresponding to columns within the Periodic Table of the elements use the "New Notation" convention as seen in the *CRC Handbook of Chemistry and Physics*, 81$^{st}$ Edition (2000-2001).

Unless otherwise defined, all technical and scientific terms used herein have the same meaning as commonly understood by one of ordinary skill in the art to which the features described herein belong. The materials, methods, and examples are illustrative only and not intended to be limiting. To the extent not described herein, many details regarding specific materials and processing acts are conventional and may be found in textbooks and other sources within the field of ceramic materials used as refractories.

In accordance with embodiments described herein, a refractory object can include beta alumina and have one or more properties that are better tailored to forming glass that includes aluminum, silicon, and magnesium ("Al—Si—Mg glass"). In an embodiment, beta alumina is less likely to form a Mg—Al oxide layer when the beta alumina is exposed to a molten alkali Al—Si—Mg glass, and thus, the beta alumina substantially prevents Mg—Al particles from being entrained into the glass being formed. After reading this specification, skilled artisans will appreciate that not all of the properties are required in all embodiments, and therefore, the description of properties is meant to illustrate, and not limit, concepts as described herein.

The refractory object can have a body or a coating overlying the body, wherein the body or coating includes a ceramic material that includes beta alumina. The ceramic material can contain at least 10 wt % of the total $Al_2O_3$ content, whether in the form of alpha-$Al_2O_3$, beta alumina, another alumina compound, or any combination thereof. The sintered ceramic material can have at least approximately 50 wt %, approximately 60 wt %, approximately 70 wt %, approximately 80 wt %, approximately 85 wt %, approximately 90 wt%, approximately 93 wt%, approximately 95 wt%, or approximately 97 wt% of the total $Al_2O_3$ content, whether in the form of alpha-$Al_2O_3$, beta alumina, another alumina compound, or any combination thereof. In the ceramic material, at least approximately 40%, at least approximately 50%, at least approximately 75%, at least approximately 90%, or at least 95% of the total $Al_2O_3$ content is from beta alumina.

The beta alumina can include a Group 1 element, a Group 2 element, a rare earth element, Pb, or any combination thereof. For the purposes of this specification, rare earth elements include Sc and the Lanthanoid elements. In an embodiment, the dopant can include $Na_2O$, $K_2O$, $Li_2O$, $Cs_2O$, MgO, BaO, SrO, PbO, $Sc_2O_3$, $La_2O_3$, $Pr_2O_3$, $Nd_2O_3$, ZnO, or any combination thereof. The dopant can be added to alpha-$Al_2O_3$ and help to convert the alpha-$Al_2O_3$ into beta alumina, and therefore, the dopant may be referred to as a beta conversion material. In another embodiment, the dopant can be added to beta alumina to modify the properties of the beta alumina, such as mechanical strength, diffusion, or the like.

In an embodiment, beta alumina includes beta' alumina having a molecular formula of 11 $Al_2O_3 \cdot X\, A_2O$ wherein A is a Group 1 element, and X is in a range of 1 to 1.6. In another embodiment, beta alumina includes beta" alumina having a molecular formula of 5 $Al_2O_3 \cdot 1\, Z$, wherein Z is $A_2O$ and A is an element in a monovalent state, or Z is MO and M is an element in a divalent state. In a further embodiment, beta alumina includes beta''' alumina having a molecular formula of 15 $Al_2O_3 \cdot 4$ MgO 1 $A_2O$, wherein A is a Group 1 element. Beta' alumina has a total $Al_2O_3$ content in a range of approximately 87 mol % to approximately 92 mol %, beta" alumina has a total $Al_2O_3$ content of approximately 83 mol %, and beta''' alumina has a total $Al_2O_3$ content of approximately 75 mol %.

The ceramic material can include another dopant, such as a sintering agent. In a particular example, the sintering agent can help to reduce porosity, which can help to improve resistance to corrosion if the refractory object is later exposed to a corrosive environment. An exemplary sintering agent can include $Ta_2O_5$, $Nb_2O_3$, $Nb_2O_5$, $TiO_2$, $Fe_2O_3$, MnO, CuO, another suitable sintering agent, or any combination thereof.

In a particular embodiment, a separate sintering agent is not used when the particular dopant as previously described can also act as a sintering agent, such as $Ta_2O_5$, $Nb_2O_3$, or $Nb_2O_5$.

The ceramic material can include yet another dopant that may help to keep the grain size within the ceramic material from becoming too large. Such a dopant can include an oxide of a rare earth element, $Ta_2O_5$, $Nb_2O_3$, $Nb_2O_5$, ZnO, MgO, $ZrO_2$, $HfO_2$, or any combination thereof. In a particular embodiment, the rare earth oxide can include $Y_2O_3$, $Sc_2O_3$, $Yb_2O_3$, $Pr_2O_3$, $Sm_2O_3$, $Gd_2O_3$, $La_2O_3$, $Ce_2O_3$, $Dy_2O_3$, or any combination thereof.

In an embodiment, the amount of beta conversion material or its corresponding dopant or combination of dopants, when expressed as a metal oxide (e.g., $Na_2O$, BaO) within the ceramic material of the body or the coating can be at least approximately 2.1 mol %, at least approximately 2.5 mol %, or at least approximately 4.5 mol %. In another embodiment, the amount may be no greater than approximately 26 mol %, no greater than approximately 17 mol %, or no greater than approximately 13 mol %. In another embodiment, the content of the metal oxide can be expressed as a mol % as compared to alpha-$Al_2O_3$. In particular, when any one or more of $Na_2O$, $K_2O$, $La_2O_3$, and $Sc_2O_3$ are used, the beta alumina can include at least approximately 2.1 mol % of these metal oxides.

For the other dopants, the amount of any such dopant, when expressed as a metal oxide, within the ceramic material of the body or the coating can be at least approximately 0.02 wt %, at least approximately 0.11 wt %, at least approximately 0.2 wt %, or at least approximately 0.5 wt %. In another embodiment, the amount may be no greater than approximately 5 wt %, no greater than approximately 4 wt %, no greater than approximately 3 wt %, no greater than approximately 2 wt %, or no greater than approximately 1.5 wt %.

In a particular embodiment, some impurities may not be present or kept at a relatively low amount, as such impurities may allow grain sizes of sintered ceramics to become unacceptably large. $TiO_2$, CaO, $SiO_2$, $Fe_2O_3$, $Na_2O$, or any combination thereof may be at a concentration of no greater than approximately 2 wt %, no greater than approximately 1.5 wt %, no greater than approximately 0.9 wt %, or no greater than approximately 0.5 wt %.

The dopant starting materials may have any oxidation state, e.g., $M^{2+}$, $M^{3+}$, $M^{4+}$, $M^{5+}$, or any combination thereof, wherein M is a metal element within the dopant. The dopant may be introduced as an oxide of any of the foregoing. For example, the dopant can be $Na_2O$, $K_2O$, $Li_2O$, MgO, BaO, SrO, $La_2O_3$, $Sc_2O_3$, etc. Alternatively, any of the foregoing elements may be added as a boride, carbide, carbonate, nitrate, halide, phosphate, sulfate, or the like, as opposed to a metal oxide. In addition, one or more dopants can be added as an oxide in combination with a boride, carbide, carbonate, nitrate, halide, phosphate, sulfate, or any combination thereof. In yet another embodiment, the dopant can be in the form of a metal aluminate, such as sodium aluminate, potassium aluminate, or the like. In an embodiment, the dopant starting material can be powder that is in the form of particles having an averaged particle size no greater than approximately 30 μm in another embodiment, the averaged particle size is no greater than approximately 20 μm and in a further embodiment, the averaged particle size is no greater than approximately 15 μm. In an embodiment, the averaged particle size is at least approximately 0.1 μm in another embodiment, the averaged particle size is at least approximately 0.5 μm and in a further embodiment, the averaged particle size is at least approximately 1 μm.

The ceramic material can be formed from alpha-$Al_2O_3$, beta alumina, a sodium aluminate, another alumina compound, a beta conversion material, or any combination thereof. When the starting material includes alpha-$Al_2O_3$, a beta conversion material (e.g., $Na_2O$) can be added in an amount sufficient to convert the alpha-$Al_2O_3$ to beta alumina. When the starting material includes beta alumina, a beta conversion material may not be used.

The process and starting materials may depend on whether the ceramic material is being used for the body or coating of the refractory object and whether a sintering technique, a casting technique, or a combination thereof is used.

In an embodiment, a body of the refractory object can include the ceramic material formed using a sintering technique. In a particular embodiment, a green body can be formed and then sintered to form the refractory object. Starting materials can include powders of the metal oxides. The alumina powder can be in the form of particles having an averaged particle size no greater than approximately 50 μm. In an embodiment, the averaged particle size is no greater than approximately 20 82 m, in another embodiment, the averaged particle size is no greater than approximately 12 μm, and in a further embodiment, the averaged particle size is no greater than approximately 9 μm or no greater than approximately 3 μm. In an embodiment, the averaged particle size is at least approximately 0.1 μm, in another embodiment, the averaged particle size is at least approximately 0.5 μm, and in a further embodiment, the averaged particle size is at least approximately 0.9 μm.

In an embodiment, the powders may be dry milled or wet milled to achieve a desired particle size. A planetary mill or rollers may be used. $Al_2O_3$ dry milling ("$Al_2O_3$ Dry") can include milling pieces of a refractory material in a planetary mill with an alpha-$Al_2O_3$ jar and an alpha-$Al_2O_3$ grinding medium. $ZrO_2$ dry milling ("$ZrO_2$ Dry") is the same as $Al_2O_3$ dry milling except the alpha-$Al_2O_3$ jar and an alpha-$Al_2O_3$ grinding medium are replaced with a $ZrO_2$ jar and a $ZrO_2$ grinding medium. $Al_2O_3$ wet milling ("$Al_2O_3$ Wet") can include milling pieces of a refractory material using an alpha-$Al_2O_3$ jar on rollers and an alpha-$Al_2O_3$ grinding medium or a $ZrO_2$ grinding medium and water. A ball mill process to crush coarser powders, and an extra step of fine milling using an attrition mill or a ball mill with finer media can also be used to reduce the particle size of the powder to the required size. In another embodiment, one or more of the powders can be jet milled. Any combination of milling techniques may also be used. After reading this specification, skilled artisans will appreciate that other materials can be used without departing from the concepts described herein.

After milling, particle distribution data can be collected on the milled powder. The particle distribution can include $10^{th}$ percentile, $50^{th}$ percentile, and $90^{th}$ percentile particle sizes. As used herein, a D10 value represents the $10^{th}$ percentile, a D50 value represents the $50^{th}$ percentile, and a D90 value represents the $90^{th}$ percentile. Thus, D50 corresponds to the median value. In an embodiment, the D10 value of a particle size of the milled powder is no greater than approximately 9 microns, no greater than approximately 3 microns, no greater than approximately 2 microns, or no greater than approximately 0.9 microns. In another embodiment, the D50 value of the particle size of the milled powder is no greater than approximately 20 microns, no greater than approximately 12 microns, no greater than approximately 9 microns, no greater than approximately 3 microns, no greater than approximately 2 microns, or no greater than approximately 0.9 microns. In a further embodiment, the D90 value of the particle size of the milled powder is no greater than approximately 90 microns, no greater than approximately 40 microns, no greater than approximately 30 microns, no greater than approximately 9 microns, or no greater than approximately 2 microns. The powder can have a specific surface area of at least approximately 0.5 $m^2/g$, at least approximately 0.9 $m^2/g$, at least approximately 1.1 $m^2/g$, or at least approximately 1.5 $m^2/g$.

If needed or desired, an additional material that can be used and include a binder, a solvent, a dispersant, a thickener, a deflocculant, another suitable ingredient, or any combination thereof. In an embodiment, the additional material may include non-metallic compounds. In another embodiment, the additional material can include an organic compound, water, or the like.

The powders and additional material are combined and shaped to form a green body into a desired shape. In one embodiment, the powders and additional materials can be combined with water to form a slurry. Shaping can be performed using a technique, such as slip casting, uniaxial pressing, isostatic pressing, casting of a gel, vibro-casting, or any combination thereof. The shape can be rectilinear, cylindrical, spherical, ellipsoidal or nearly any other shape. In a particular embodiment, the body can be in the shape of a rectilinear block referred to as a blank that can subsequently be machined to form a glass overflow forming block. In another embodiment, the green body can be structured in such a fashion to more closely match the final refractory object to reduce the extent of any further machine processing. For example, when the refractory object includes a glass overflow forming block, the shape of the green body may more closely resemble the glass overflow forming block to reduce the amount of subsequent machining and ceramic material that would be discarded. More particularly, the green body may have a rectilinear portion adjacent to a tapered portion. The rectilinear portion corresponds to a region where a glass overflow trough will be formed. In another embodiment, the green body may be shaped to have the glass overflow trough adjacent to the tapered portion.

After the green body is formed, the green body is heated in an oven, heater, furnace, or the like to form the refractory object that includes a sintered ceramic material. The heating process can include an initial heating where moisture, a solvent, or another volatile component is evaporated, organic material is vaporized, or any combination thereof. The initial heating can be conducted at a temperature in a range of approximately 100° C. to approximately 300° C. for a time period in a range of approximately 2 hours to approximately 400 hours. Following the initial heating, the sintering can be performed at a temperature in a range of approximately 1400° C. to approximately 1700 ° C. for a time period in a range of approximately 10 hours to approximately 100 hours to form the body of the refractory object. In a particular embodiment, the sintering can be performed at a temperature no greater than approximately 1650° C. or no greater than approximately 1600° C. During sintering, some shrinkage may occur, and the body may be smaller than the green body.

The sintering may be performed in an open container, such as an open muffle, or a closed container, such as a closed muffle. A closed container may help to keep the beta alumina from changing to alpha-$Al_2O_3$. Some of the dopants used in beta alumina, such as $Na_2O$ may be volatilized during the relatively high temperatures for sintering. As the dopant is lost, the beta alumina may change to alpha-$Al_2O_3$. When a closed container is used, the ambient may include a source separate from the refractory object that provides an additional amount of the metal element that can help to reduce the amount of beta alumina that changes to alpha-$Al_2O_3$ during sintering of the refractory object. For example, when the beta alumina includes Na, the closed container can include a source that provides an additional amount of Na to help reduce volatile losses of $Na_2O$ when the beta alumina is sintered. The additional amount of Na can be provided in the form of a saturated atmosphere of NaOH, a Na salt, a sodium aluminate, beta alumina (located outside the body), or the like.

If the body of the refractory object was sintered, a surface portion of the body may have some of the beta alumina converted to alpha-$Al_2O_3$, or may have a lower beta alumina content as compared to the beta alumina content at the center of the body. The surface portion may be at least approximately 2 μm thick, at least approximately 20 μm thick, at least approximately 50 μm thick, or at least approximately 110 μm thick, or even thicker, such as up to 4 mm thick. The surface portion can be removed, so that an exposed surface of the body has relatively higher beta alumina than if the surface portion was not removed.

The body of the refractory object may be formed using a casting technique, such as fusion casting. Alpha-$Al_2O_3$, beta alumina, sodium aluminate, another alumina compound, another source of a beta conversion material (e.g., $Na_2O$) or any combination thereof, may be used. The starting materials are combined and heated to form a molten composition. In an embodiment, the heating can be performed as electrical arc heating. The molten composition is then cast into a mold and the molten composition is allowed to cool to form the body. The body can then be removed from the mold and can be machined down to form the isopipe.

In an embodiment as illustrated in FIG. 1, a body of a refractory object 100 can be a refractory block 102 having a rectilinear shape having a length (l), width (w), and height (h). In an embodiment, any of the dimensions l, w, or h can be at least approximately 0.02 m, at least approximately 0.05 m, at least approximately 0.11 m, at least approximately 0.5 m, at least approximately 1.1 m, at least approximately 2.0 m, at least approximately 4.0 m, at least approximately 5.0 m, at least approximately 6.0 m, or more. In the embodiment as illustrated in FIG. 1, the refractory block 102 can be a blank from which a glass overflow forming block can be formed.

Figure 2:
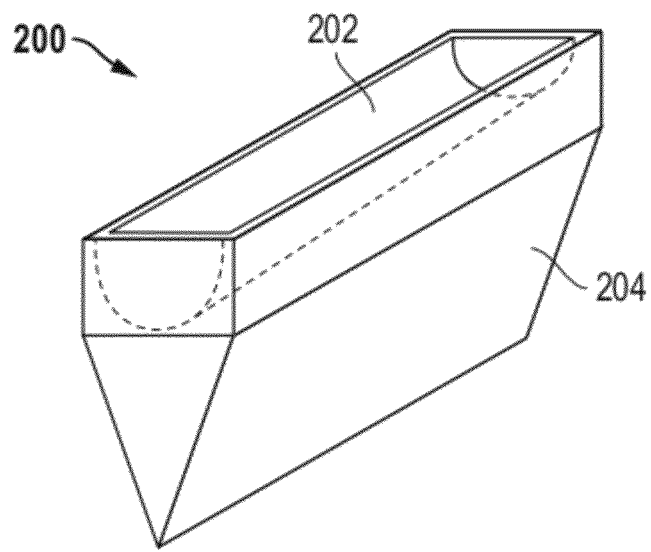
FIG. 2 is a diagram illustrating a particular embodiment of a glass overflow forming block.

The refractory block 102 can be machined to produce a different shape, a smoother surface, or both. The refractory block 102 can be machined to form a glass overflow forming block 200, as illustrated in FIG. 2. The glass overflow forming block 200, which is also a refractory object, includes a glass overflow trough portion 202 and a tapered portion 204. The glass overflow trough portion 202 includes a trough that has a depth that decreases along a length of the glass overflow forming block 200. FIG. 3 includes a cross-sectional view of exemplary shapes of the tapered portion 204. More particularly, the tapered portion can include a wedge shape 2042, a concave shape 2044, or a convex shape 2046. Other shapes may be used to meet the needs or desires for a particular application.

Figure 4:
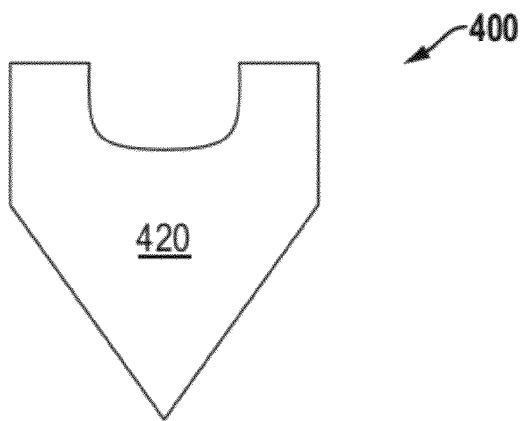
FIG. 4 is an illustration of a refractory object including a body.
Figure 5:
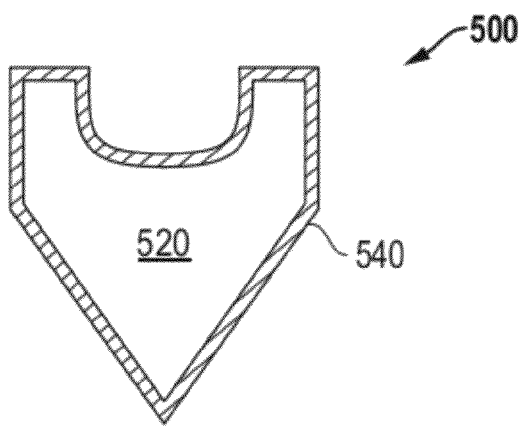
FIG. 5 is an illustration of a refractory object including a coating over a body.

In an embodiment, a refractory object 400 that includes a body 420 without any coating, is illustrated in FIG. 4. In yet another embodiment, the refractory object may include a coating that includes beta alumina that covers a body having a different composition. FIG. 5 includes an illustration of a refractory object 500 that includes a body 520 and a coating 540. The body 520 can include substantially no or a lower content of beta alumina than the coating. The composition of the body 520 may be selected on the basis of a lower creep rate, better mechanical integrity at temperatures used for molten glass, a coefficient of thermal expansion ("CTE") closer to beta alumina as compared to other compositions that can be used, another suitable characteristic, or any combination thereof. The body 520 can include alpha-$Al_2O_3$, a mixture of alpha-$Al_2O_3$ and beta alumina, a zircon, a mullite, SiC, or any combination thereof. In a particular embodiment, the body 520 can include at least approximately 50 wt %, at least approximately 75 wt %, at least approximately 85 wt %, at approximately least 90 wt %, or at least approximately 95 wt % alpha-$Al_2O_3$. Any of the foregoing materials for the body 520 may include one or more dopants for a sintering agent, particle size control, another desirable characteristic, or any combination thereof.

The coating 540 may be formed by vapor deposition (chemical or physical), plasma spray, flame spray of a beta alumina powder, formed from the deposition of a slurry, another suitable coating technique, or the like. The coating 540 can be annealed if needed or desired. In an embodiment, the body 540 can have a thickness of at least approximately 100 μm, at least approximately 250 μm, or at least approximately 500 μm. In another embodiment, the body 540 can have a thickness no greater than approximately 5000 μm, no greater than approximately 1500 μm, or no greater than approximately 900 μm.

Figure 6:
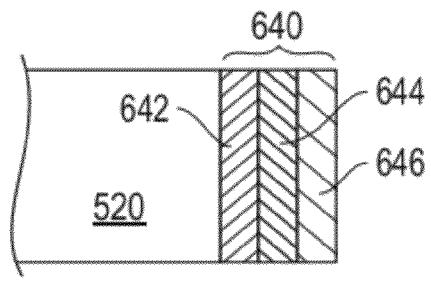
FIG. 6 is an illustration of a refractory object including a coating over a body, wherein the coating includes discrete layers.

In an embodiment, the coating can be a single layer having a substantially uniform composition, such as the coating 540 in FIG. 5. In another embodiment, the coating can include a plurality of layers having different compositions. FIG. 6 includes an illustration of a portion of a refractory object 600 that includes the body 520 and a coating 640. The coating 640 includes layers 642, 644, and 646. The number of layers within the plurality of layers can include 2, 3, 4, 5, 9, 11, or even more. The plurality of layers may help to accommodate a CTE mismatch between the composition of the body 520 and beta alumina. More particularly, the layer 642 may have a CTE closer to the CTE of the body 520 than the CTE of the layer 646, and the layer 644 may have a CTE closer to the CTE of the layer 646 than the CTE of the body 520.

In another embodiment, when the body 520 comprises alpha-$Al_2O_3$, the opposing surfaces of the coating 640 can have a higher alpha-$Al_2O_3$:beta alumina ratio near the surface closer to the body 520 and a lower alpha-$Al_2O_3$:beta alumina ratio near the opposing surface. In the embodiment as illustrated in FIG. 6, the layers 642, 644, and 646 can have different alpha-$Al_2O_3$:beta alumina ratios, such that the alpha-$Al_2O_3$:beta alumina ratio of the layer 644 is less than the alpha-$Al_2O_3$:beta alumina ratio of the layer 642 and greater than the alpha-$Al_2O_3$:beta alumina ratio of the layer 646.

In a particular embodiment, the body can include at least 80 wt % alpha-$Al_2O_3$, and the layer 646, which is at the exposed surface of the refractory object 600, can include at least 80 wt % beta alumina. In a particular embodiment, the layer 646 is substantially at least approximately 95 wt % beta alumina and includes substantially no alpha-$Al_2O_3$. The layer 644 can have a lower beta alumina content as compared to the layer 646, and the layer 642 can have a lower beta alumina content and a higher alpha-$Al_2O_3$ content as compared to the layer 644. In another embodiment, a layer can have a composition that changes continuously as a function of thickness, such that beta alumina content increases with increasing thickness. When the body 520 is mostly a non-alumina material, the coating can include beta alumina and the material of the body or yet another material that is compatible (i.e., does not adversely interact) with beta alumina and the body 520

In a finished refractory object, an exposed surface, whether the body (without a coating) or the coating, can include alumina, wherein the beta alumina makes up at least approximately 50%, at least approximately 75%, at least approximately 85%, at approximately least 90%, at least approximately 95% of the total $Al_2O_3$ content within the refractory object.

The refractory object may have one or more properties that are particularly noteworthy. Such properties can include little or no significant formation of a Mg—Al oxide layer between the body or coating of the refractory object and an Al—Si—Mg glass. Other properties, such as density and porosity, are also addressed.

When a molten alkali Al—Si—Mg glass comes in contact with beta alumina, no significant amount of a Mg—Al oxide layer forms. Thus, beta alumina can be compared to alpha-$Al_2O_3$ in which a Mg—Al oxide layer can form when a molten alkali Al—Si—Mg glass is exposed to alpha-$Al_2O_3$. The formation of the Mg—Al oxide layer may subsequently lead to a part of the Mg—Al oxide layer entering the molten glass and cause a defect in a glass sheet being formed. Thus, the beta alumina and glass can form a relatively clean interface without an intermediate layer forming between the two.

Density and porosity of the refractory object can be determined using ASTM C20-00 Standard Test Method (reapproved 2005). The density of beta alumina depends in part on the dopant in the beta alumina. For example, a beta alumina that includes Na may have a lower density than a beta alumina that includes a rare earth element, such as Sc, La or the like. In an embodiment, the density can be at least approximately 2.50 g/cc, at least approximately 2.60 g/cc, at least approximately 2.80 g/cc, or at least approximately 3.00 g/cc. In another embodiment, the density may be no greater than approximately 3.90 g/cc, no greater than approximately 3.70 g/cc, or no greater than approximately 3.50 g/cc. In an embodiment, the porosity is expressed as a volume percent ("vol %"). In an embodiment, the porosity of the refractory object is at least approximately 0.1 vol %, at least approximately 1 vol %, or at least approximately 5 vol %. In another embodiment, the porosity is no greater than approximately 20 vol %, no greater than approximately 10 vol %, no greater than approximately 7 vol %, no greater than approximately 2 vol %.

Figure 7:
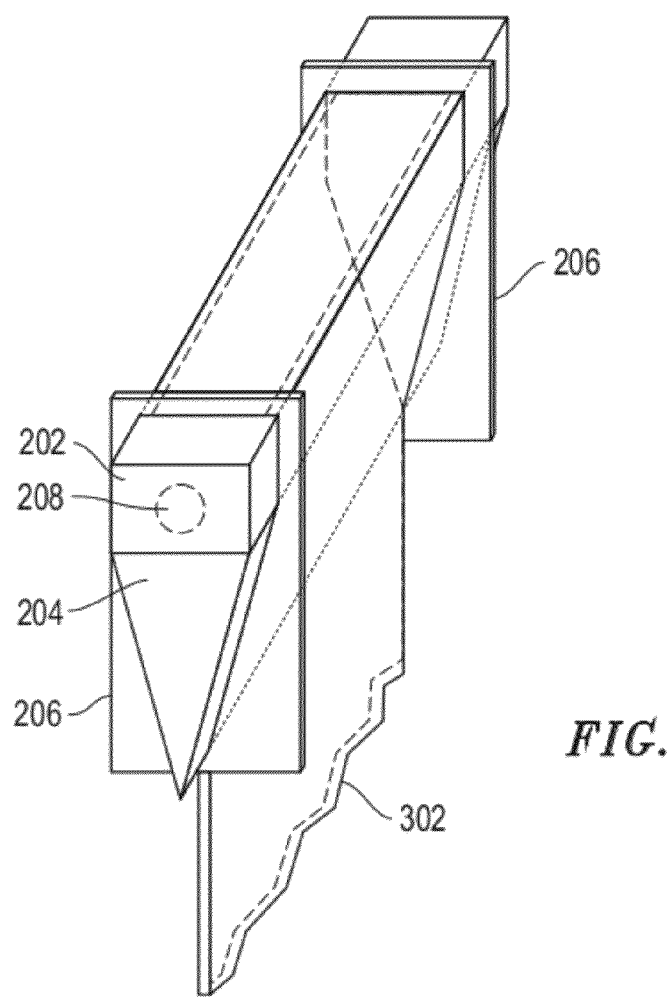
FIG. 7 is a diagram illustrating the formation of a particular glass sheet from the glass overflow forming blocks.
Figure 8:
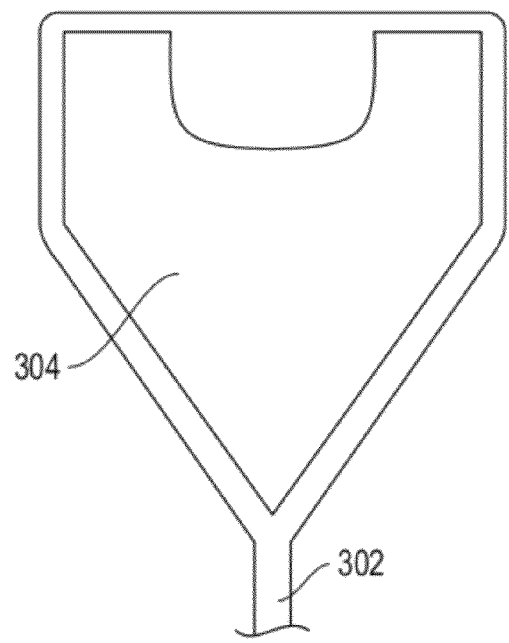
FIG. 8 is a diagram illustrating the cross-sectional setup of a glass overflow trough during glass production.

The refractory object, when in the form of a glass overflow forming block, can be useful in forming a glass sheet by a fusion process. FIGS. 7 and 8 include a perspective view and a cross-sectional view, respectively, of the glass overflow forming block during the formation of a glass sheet 302. The glass overflow forming block is heated to a temperature in a range of approximately 1050° C. to approximately 1300° C. The glass overflow forming block includes the glass overflow trough portion 202 and the tapered portion 204, as previously described. In the embodiment as illustrated, the glass overflow forming block also includes end guards 206 that generally define the width of the glass sheet 302 to be formed. The glass overflow forming block further includes an inlet port 208 that receives a molten glass composition. A trough within the glass overflow trough portion 202 receives the molten glass composition until the trough fills up. Thereafter, the molten glass composition flows over opposing lips of the glass overflow trough portion 202. The molten glass composition then flows along opposite outer surfaces of the glass overflow trough portion 202 and the tapered portion 204. At the end of the tapered portion 204 that is opposite the glass overflow trough potion 202, the molten glass composition along the opposite outer surfaces fuse together to form the glass sheet 302. In another embodiment, another type of glass object may be formed.

In an embodiment, the glass sheet 302 can have a thickness of at least approximately 20 μm, at least approximately 30 μm, or at least approximately 50 μm. In another embodiment, the glass sheet 302 may have a thickness no greater than approximately 5 mm, no greater than approximately 3 mm, or no greater than approximately 1.1 mm. With respect to the width, the process allows the end guards 206 to be set to permit any desired width of the glass sheet 302. For example, the glass sheet 302 can have a width of at least approximately 0.5 m, at least approximately 1.1 m, at least approximately 2.0 m, at least approximately 4.0 m, or larger.

In a particular embodiment, the molten glass composition includes an Al—Mg—Si glass. In a more particular embodiment, the molten glass composition is substantially the same as described. Referring to FIG. 8, a Mg—Al oxide does not form along a surface of the refractory object when the surface is exposed to a molten glass including an Al—Si—Mg oxide.

Many different aspects and embodiments are possible. Some of those aspects and embodiments are described herein. After reading this specification, skilled artisans will appreciate that those aspects and embodiments are only illustrative and do not limit the scope of the present invention.

In a first aspect, a refractory object can comprise $Al_2O_3$, and at least approximately 50% of the $Al_2O_3$ includes a beta alumina, wherein the refractory object can be used in a glass fusion process.

In a second aspect, a refractory object can have a total $Al_2O_3$ content of at least 10% by weight. A Mg—Al oxide may not form along a surface of the refractory object when the surface is exposed to a molten glass that includes an Al—Si—Mg oxide. The refractory object can be used in a glass fusion process.

In a third aspect, a process of forming a refractory object can include preparing a body that includes $Al_2O_3$ and at least approximately 50% of the $Al_2O_3$ includes a beta alumina. The process can also include sintering the body to form the refractory object. The refractory object can be used in a glass fusion process.

In an embodiment of the third aspect, sintering is performed at a temperature no greater than approximately 1700° C., no greater than approximately 1650° C., or no greater than approximately 1600° C. In a particular embodiment, sintering is performed in an open container or a closed container. In a more particular embodiment, sintering is performed in an ambient including a vapor that includes a Group 1 element, a Group 2 element, a rare earth element, Pb, or any combination thereof provided by a source separate from the refractory object.

In still another embodiment of the third aspect, the process further includes milling a number of powders that are provided to form the refractory object. Milling the number of powders can produce a milled powder that includes each of the number of powders. In a particular embodiment, milling is performed as dry milling, wet milling, or any combination thereof. In another particular embodiment, a D10 value of a particle size of the milled powder is no greater than approximately 9 microns, no greater than approximately 3 microns, no greater than approximately 2 microns, or no greater than approximately 0.9 microns. In addition, a D50 value of the particle size of the milled powder is no greater than approximately 20 microns, no greater than approximately 12 microns, no greater than approximately 9 microns, no greater than approximately 3 microns no greater than approximately 2 microns, or no greater than approximately 0.9 microns. Further, a D90 value of the particle size of the milled powder is no greater than approximately 90 microns, no greater than approximately 40 microns, no greater than approximately 30 microns, no greater than approximately 9 microns, or no greater than approximately 2 microns. In a further particular embodiment, the milled powder includes alpha-$Al_2O_3$, beta alumina, or any combination thereof. In yet a further particular embodiment, after milling, the milled powder has a specific surface area of at least approximately 0.5 m²/g, at least approximately 0.9 m²/g, at least approximately 1.1 m²/g, or at least approximately 1.5 m²/g.

In a fourth aspect, a process of forming a refractory object can include melting a powder to form a molten composition, wherein the powder includes an alpha-$Al_2O_3$ and a beta conversion material; a beta alumina; or any combination thereof. The process can also include filling a mold with the molten composition, wherein the mold has a pattern corresponding to the refractory object, and cooling the refractory object, wherein the refractory object includes a beta alumina and is capable of being used in a glass fusion process.

In an embodiment of the foregoing aspects and embodiments, the beta conversion material includes a Group 1 element, a Group 2 element, a rare earth element, Pb, or any combination thereof. In another embodiment, the process further includes sintering the refractory object.

In a further embodiment of any of the foregoing aspects and embodiments, the process further includes shaping the refractory object into a glass overflow forming block.

In a fifth aspect, a process for forming a refractory object used in forming a glass object can include forming a body that includes a refractory material and forming a coating over the body. The coating can include a beta alumina, and the coating and refractory material have different compositions.

In a sixth aspect, a process of forming a glass object can include providing a refractory object that includes a glass overflow forming block that includes a beta alumina at a surface of the glass overflow forming block, and flowing a glass material including an Al—Si—Mg oxide into the glass overflow forming block and over a lip of the glass overflow forming block. The glass material can contact the beta alumina. During the flowing of the glass material, a Mg—Al oxide may not form along the beta alumina at the surface of the glass overflow forming block.

In an embodiment of the sixth aspect, the glass object is in a form of a glass sheet. In a particular embodiment, the glass sheet has a thickness of at least approximately 20 at least approximately 30 or at least approximately 50 μm. In another particular embodiment, the glass sheet has a thickness no greater than approximately 5 mm, no greater than approximately 3 mm, or no greater than approximately 1.1 mm. In still another particular embodiment, the glass sheet has a width of at least approximately 0.2 m, at least approximately 0.5 m, at least approximately 0.7 m, at least approximately 1.1 m, at least approximately 2.0 m, at least approximately 2.4 m, or at least approximately 2.8 m. In another embodiment, the glass object includes an alkali glass.

In a particular embodiment of any of the embodiments or aspects described herein, a Mg—Al oxide does not form along a surface of the refractory object when the surface is exposed to a molten glass that includes an Al—Si—Mg oxide. In another embodiment, the refractory object includes a glass overflow forming block. In still another embodiment, the glass overflow forming block has a cross section in a shape that is tapered from the bottom of the glass overflow forming block. In a particular embodiment, the glass overflow forming block has a cross section in a shape of a wedge. In yet another embodiment, the refractory object can have a total $Al_2O_3$ content of at least approximately 80%, at least approximately 90%, or at least approximately 95%. In a further embodiment, the beta alumina makes up at least approximately 50%, at least approximately 70%, at approximately least 90%, at least approximately 95% of the total alumina content within the refractory object.

In a particular embodiment of any of the embodiments or aspects described herein, the refractory object includes a body and a coating along at least a portion of the body, wherein the coating includes the beta alumina. In a more particular embodiment, the coating has a thickness no greater than approximately 5000 μm, no greater than approximately 1500 μm, or no greater than approximately 900 μm. In another more particular embodiment, the coating has a thickness of at least approximately 100 μm, at least approximately 250 μm, or at least approximately 500 μm.

In a particular embodiment of any of the embodiments or aspects described herein, the coating includes a single layer or a plurality of layers. In a more particular embodiment, the coating has a substantially uniform composition. In another more particular embodiment, the plurality of layers includes an inner layer and outer layer, wherein the inner layer is disposed between the body and the outer layer, and the coefficient of thermal expansion of the inner layer is between the coefficients of thermal expansion of the body and the outer layer. In a further more particular embodiment, the coating has a first surface and a second surface opposite the first surface, where the first surface is closer to the body than the second surface. The coating can have a first alpha-$Al_2O_3$:beta alumina ratio near the first surface and a second alpha-$Al_2O_3$:beta alumina ratio near the second surface. In an embodiment, the first alpha-$Al_2O_3$:beta alumina ratio is greater than the second alpha-$Al_2O_3$:beta alumina ratio. In an even more particular embodiment, the coating has an intermediate region spaced apart from the first surface and the second surface, where the intermediate region has an intermediate alpha-$Al_2O_3$:beta alumina ratio that is less than the first alpha-$Al_2O_3$:beta alumina ratio and greater than the second alpha-$Al_2O_3$:beta alumina ratio.

In a particular embodiment of any of the embodiments or aspects described herein, the body includes zircon, mullite, SiC, alpha-$Al_2O_3$, beta alumina, or any combination thereof. In a more particular embodiment, the body includes at least approximately 40 wt %, at least approximately 50 wt %, at least approximately 70 wt %, at approximately least 90 wt %, or at least 95 wt % alpha-$Al_2O_3$. In another particular embodiment, the refractory object includes a first dopant that includes a Group 1 element, a Group 2 element, a rare earth element, Pb, or any combination thereof. In a more particular embodiment, the first dopant includes Na, K, Li, Cs, Mg, Ba, Sr, Pb, Sc, La, Pr, Nd, or any combination thereof. In another more particular embodiment, the refractory object includes no greater than approximately 26 mol %, no greater than approximately 17 mol %, or no greater than approximately 13 mol % of the first dopant. In a further more particular embodiment, the refractory object includes at least approximately 2.1 mol %, at least approximately 2.5 mol %, or at least approximately 4.5 mol % of the first dopant.

In a particular embodiment of any of the embodiments or aspects described herein, the refractory object includes a sintering agent. In a more particular embodiment, the sintering agent includes Ta, Nb, Ti, Fe, Mn, Cu, or any combination thereof. In another particular embodiment, the refractory object includes a second dopant that includes a rare earth element, Ta, Nb, Mg, Zr, Hf, Zn, or any combination thereof. In a more particular embodiment, the rare earth element includes Y, Sc, Yb, Pr, Sm, Gd, La, Ce, Dy, or any combination thereof. In a further particular embodiment, the sintering agent is different from the second dopant.

In a particular embodiment of any of the embodiments or aspects described herein, the refractory object has a density of at least approximately 2.50 g/cc, at least approximately 2.60 g/cc, at least approximately 2.80 g/cc, or at least approximately 3.00 g/cc. In another particular embodiment, the refractory object has a density no greater than approximately 3.90 g/cc, no greater than approximately 3.70 g/cc, or no greater than approximately 3.50 g/cc. In still another particular embodiment, the refractory object has a porosity of at least approximately 0.1 vol %, at least approximately 1 vol %, or at least approximately 5 vol %. In yet another particular embodiment, the refractory object has a porosity no greater than approximately 20 vol %, no greater than approximately 10 vol %, no greater than approximately 7 vol %, no greater than approximately 2 vol %.

In a particular embodiment of any of the embodiments or aspects described herein, the refractory object includes $TiO_2$, CaO, $SiO_2$, $Fe_2O_3$, $Na_2O$, or any combination thereof, at a concentration of no greater than approximately 2 wt %, no greater than approximately 1.5 wt %, no greater than approximately 0.9 wt %, or no greater than approximately 0.5 wt %. In another particular embodiment, the refractory object has no coating. In a further particular embodiment, the refractory object has a length of at least approximately 0.5 m, at least approximately 1.1 m, at least approximately 2.0 m, at least approximately 4.0 m, at least approximately 5.0 m, or at least approximately 6 m.

EXAMPLES

The concepts described herein will be further described in the following examples, which do not limit the scope of the features described in the claims. Numerical values in this Examples section may be approximated or rounded off for convenience.

Refractory objects including a variety of different sintered ceramic materials are prepared using the following process and following raw materials. Table 1 includes the compositions of samples, all of which are principally alumina containing. Trace levels of impurities may be present but are not reported, as such impurities typically do not significantly affect the performance of such samples.

The samples of different beta alumina refractories materials have compositions and properties as set forth in Table 1.

The samples are put in contact with a molten glass composition at 1150° C. for 120 hours without any significant relative motion between the samples and the molten glass composition (static test). The molten glass composition includes 61.9 wt % $SiO_2$, 17.5 wt % $Al_2O_3$, 12.6 wt % $Na_2O$, 3.5 wt % $K_2O$, and 3.5 wt % MgO.

Figure 9:
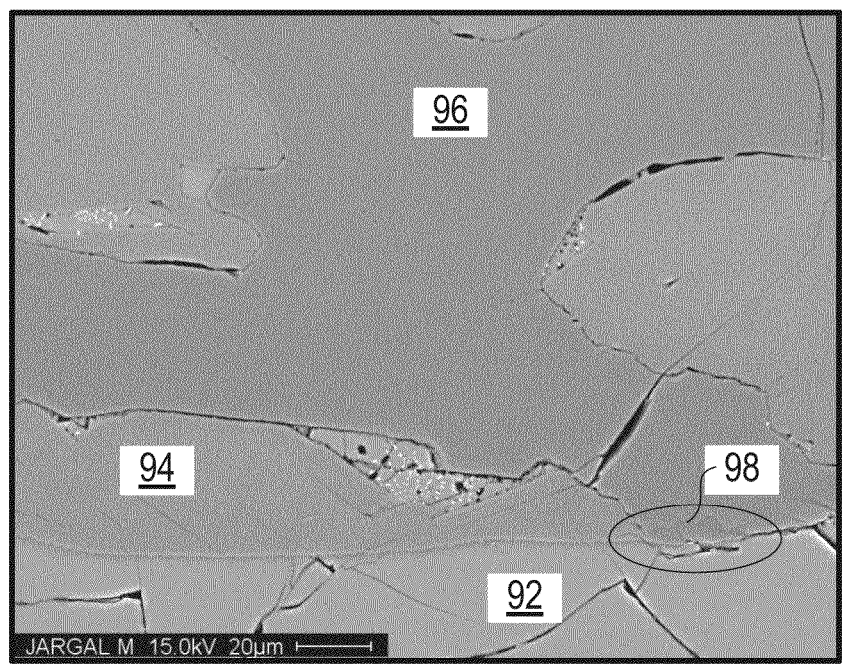
FIGS. 9 to 11 are SEM images of a cross-sectional portion of different beta alumina-containing refractory materials after exposure to a molten alkali Al—Mg—Si glass.

FIG. 9 includes a scanning electron microscope ("SEM") image of the Jargal-M™-brand refractory and the glass after the static test. Where the glass 92 contacts the beta alumina 94, there is no layer between the glass 92 and beta alumina 94. At locations wherein beta alumina 94 does not lie between the portions of the alpha-$Al_2O_3$ 96, a spinel layer 98 (within the oval as illustrated in FIG. 9) is formed between the alpha-$Al_2O_3$ 96 and glass 92.

Figure 10:
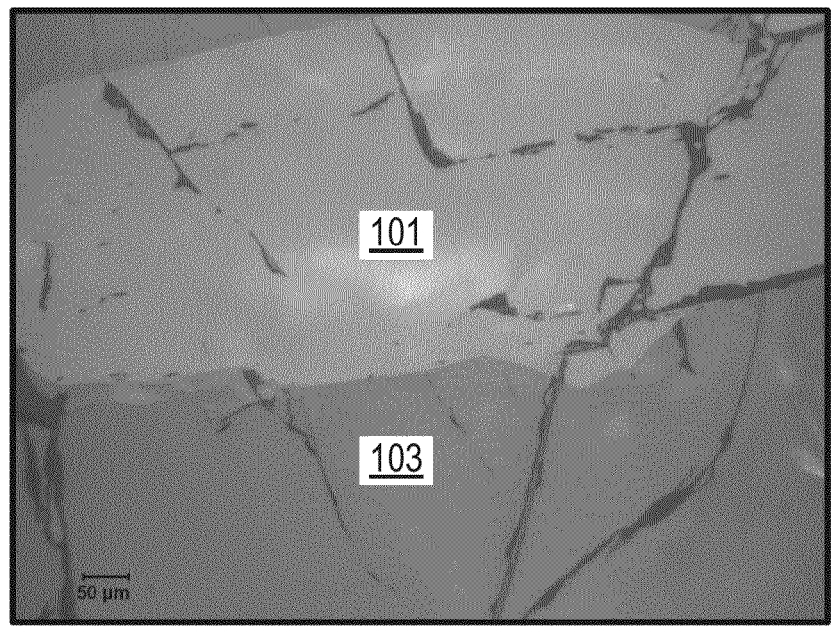

FIG. 10 includes a SEM image of the Jargal H™-brand refractory 101 and the glass 103 after the static test. As illustrated in FIG. 10, the glass 103 contacts the beta alumina 101 and there is no layer between the glass 103 and beta alumina 101. Neither a separate alpha-$Al_2O_3$ phase nor a spinel layer is present in the SEM image.

Figure 11:
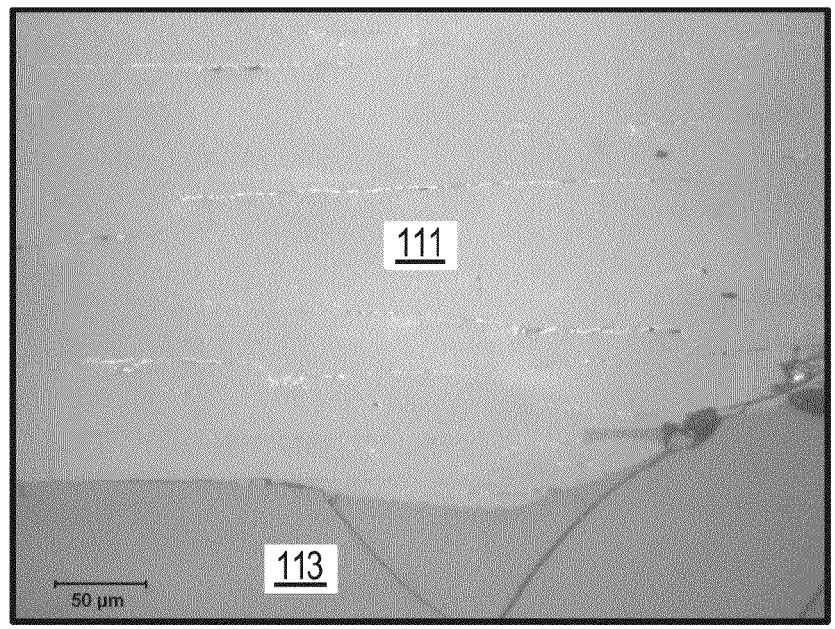

FIG. 11 includes a SEM image of the beta alumina with MgO refractory 111 and the glass 113 after the static test. As illustrated in FIG. 11, the glass 113 contacts the refractory 111 and there is no layer between the glass 113 and the refractory 111. Neither a separate alpha-$Al_2O_3$ phase nor a spinel layer is present in the SEM image.

Unlike alpha-$Al_2O_3$, a spinel layer does not form between the beta alumina and the molten glass composition during static tests. Therefore, the glass formed using beta alumina refractory will not have defects from a spinel layer because a spinel layer is not formed.

Further samples are formed using different preparation and sintering conditions. Three different milling conditions are used. $Al_2O_3$ dry milling ("$Al_2O_3$ Dry") includes milling pieces of a refractory material for 30 minutes in a planetary mill with an alpha-$Al_2O_3$ jar and an alpha-$Al_2O_3$ grinding medium. $ZrO_2$ dry milling ("$ZrO_2$ Dry") is the same as $Al_2O_3$ dry milling except the alpha-$Al_2O_3$ jar and an alpha-$Al_2O_3$ grinding medium are replaced with a $ZrO_2$ jar and a $ZrO_2$ grinding medium. Both $Al_2O_3$ and $ZrO_2$ dry milling are performed without a liquid, such as water. $Al_2O_3$ wet milling ("$Al_2O_3$ Wet") includes milling pieces of a refractory material using alpha-$Al_2O_3$ jar on rollers and an alpha-$Al_2O_3$ grinding medium and water. Table 2 includes particle distribution data for the powders after milling.

TABLE 1

| Content/Properties | Jargal M ™-brand refractory | Jargal H ™-brand refractory | Beta''' alumina |
|---|---|---|---|
| $Al_2O_3$ (wt %) | 95 | 92 | 87.5 |
| $Na_2O$ (wt %) | 4 | 7 | 4.5 |
| $SiO_2$ (wt %) | 0.5 | <1 | 0.5 |
| MgO (wt %) | — | — | 7.5 |
| $Na_2O$ (mol %) | 6.7 | 11.4 | 6.7 |
| MgO (mol %) | — | — | 16.8 |
| Main crystallographic phase | Beta alumina 53%/ Alpha-$Al_2O_3$ 45% | Beta' alumina | $15Al_2O_3$—4MgO—$Na_2O$ |
| Secondary phase | | Alpha-$Al_2O_3$ < 2% | Alpha-$Al_2O_3$ < 2% |
| Bulk density (g/cc) | 3.3 to 3.4 | 2.6 to 2.85 | 2.9 |

TABLE 2

| Milling Conditions | D10 (micron) | D50 (micron) | D90 (micron) | SSA ($m_2$/g) |
|---|---|---|---|---|
| $Al_2O_3$ Dry | 2 | 11.3 | 34.9 | 0.74 |
| $Al_2O_3$ Dry + $ZrO_2$ Dry | 1.65 | 8.8 | 25.2 | 1.05 |

TABLE 2-continued

| Milling Conditions | D10 (micron) | D50 (micron) | D90 (micron) | SSA (m₂/g) |
|---|---|---|---|---|
| Al₂O₃ Dry + ZrO₂ Dry + Al₂O₃ Wet | 0.53 | 0.84 | 1.39 | — |

The wet milling provides smaller particles and a more tightly distributed particle size, as 90% of all particles have a particle size of 1.39 microns or smaller. After milling, of the alumina within the milled powder, 41% is alpha-Al₂O₃ and 59% is beta alumina.

The samples are made using powders from different milling conditions and using different sintering conditions. Some samples are subject to x-ray diffraction analysis and chemistry to obtain the information for determining how much of the Al₂O₃ within the sintered material is alpha-Al₂O₃ and beta alumina.

After milling, the powders are isopressed to form pellets having an average mass of approximately 25 g. The pellets are sintered using one of four different sintering conditions as listed below:

1600° C. for 10 hours in an open container, wherein the ambient is air;
1600° C. for 10 hours in a closed container, wherein the ambient is air and filled with pieces of Jargal-M™-brand refractory to saturate the atmosphere with NaOH;
1700° C. for 10 hours in an open container, wherein the ambient is air;
1700° C. for 10 hours in a closed container, wherein the ambient is air and filled with pieces of Jargal-M™-brand refractory ("JM") to saturate the atmosphere with NaOH.

FIG. 12 includes a table for a set of samples that are formed from pieces of Jargal-M™-brand or Jargal-H™-brand refractory. Samples 1 to 20 are formed from fuse-cast pieces of Jargal-M™-brand that is milled into a powder, and Samples 21 to 23 are formed from fuse-cast pieces of Jargal-H™-brand refractory that is milled into a powder. For the Jargal-M™-brand refractory samples, some of the samples are only Al₂O₃ dry milled (Samples 1 and 2), other samples are Al₂O₃ dry milled and ZrO₂ dry milled (Samples 3 to 8), and further samples are Al₂O₃ dry milled, ZrO₂ dry milled, and Al₂O₃ wet milled (Samples 9 to 20). Some of the samples include approximately 1 wt % ZnO (Samples 7, 8, and 17 to 20) or approximately 1 wt % MgO (Samples 5, 6, and 13 to 16). Samples 13 and 14 are re-tested for porosity and density. Samples 21 to 23 (Jargal-H™-brand refractory) are wet milled. Sample 21 does not include any added ZnO or MgO, Sample 22 includes approximately 1 wt % MgO, and Sample 23 includes approximately 1 wt % ZnO.

Some observations are made in view of the data within the table in FIG. 12. The observations with respect to Jargal-M™-brand refractory are presented before the observations with respect Jargal-H™-brand refractory ("JH").

For the Jargal-M™-brand refractory, unexpectedly, the wet-milled samples retain significantly more beta alumina as compared to the dry-milled samples. The unmilled powders have approximately 59% beta alumina. The MgO-containing wet-milled sample has the lowest beta alumina loss where the beta alumina is approximately 57%. The ZnO-containing wet-milled samples have lower beta alumina loss as compared to the wet-milled samples without any Mg or Zn. The dry-milled sample lost more than twice as much Al₂O₃ as compared to the wet-milled samples.

For the Jargal-M™-brand refractory, the porosity is higher and the density is lower for the samples that are only dry milled, as compared to samples that are wet milled. The samples that are wet milled have a smaller particle size as compared to the samples that are dry milled, due to the different milling conditions. When comparing the dry-milled samples between one another, the samples that are only Al₂O₃ dry milled have about the same porosity and density as compared to samples that are Al₂O₃ dry milled and ZrO₂ dry milled.

For the Jargal-M™-brand refractory, the addition of MgO helps to reduce porosity for samples that are wet milled. The porosity for the MgO-containing, wet-milled samples is no greater than approximately 0.04 vol % when sintered at approximately 1600° C. and no greater than approximately 1.75 vol % when sintered at approximately 1700° C. Compare the MgO-containing, wet-milled samples with the other wet milled samples, in which porosity is at least approximately 0.36 vol % when sintered at approximately 1600° C. and at least approximately 4.95 vol % when sintered at approximately 1700° C. The data is insufficient to make any observations of the density between the different wet-milled samples. The addition of MgO or ZnO does not appear to have a significant effect on the porosity and density for the dry-milled samples.

For the wet-milled samples using the Jargal-M™-brand refractory, samples sintered at the lower sintering temperature (approximately 1600° C.) have a lower porosity and a higher density as compared to samples sintered at the higher sintering temperature (approximately 1700° C.). The porosity for the wet samples sintered at approximately 1700° C. have a porosity that is at least 5 times higher than the wet samples sintered at approximately 1600° C. In particular, Sample 12 has a porosity that is approximately 7.8 times higher than the porosity of Sample 10, both of which do not include any added ZnO or MgO and are sintered in a closed container with Jargal-M™-brand refractory. For the MgO-containing wet-milled samples, Sample 15 has a porosity that is approximately 39 times higher than the porosity of Sample 13 ((Re-test of density and porosity). For the ZnO-containing wet-milled samples, Sample 19 has a porosity that is approximately 12 times higher than the porosity of Sample 17. Note that other samples within each of the three different groups have an even greater difference in porosity at the different sintering temperatures, when all other parameters are held constant. With respect to density, the difference between sintering at approximately 1600° C. and approximately 1700° C. is seen with the data; however, the difference is not as large as it is for the porosity.

For the dry-milled samples using the Jargal-M™-brand refractory, the sintering temperature does not appear to have a significant effect on the porosity or density.

The addition of Jargal-M™-brand refractory to the closed sintering environment appears to have a small effect on the porosity. For the wet-milled samples, the addition of Jargal-M™-brand refractory appears to have lower porosity as compared to the samples having the same composition and sintering conditions. For example, Sample 9 has a porosity of approximately 0.36 vol %, and Sample 10 has a porosity of approximately 0.72 vol %, and Sample 15 has a porosity of approximately 1.54 vol %, and Sample 16 has a porosity of approximately 1.75 vol %. The data for the dry-milled samples do not appear to have any correlation between the addition of Jargal-M™-brand refractory and porosity.

The addition of Jargal-M™-brand refractory does not appear to have a correlation to the density for both the dry-milled and wet-milled samples.

For the wet-milled samples using the Jargal-M™-brand refractory, samples sintered at the lower sintering temperature (approximately 1600° C.) have a lower porosity and a higher density as compared to samples sintered at the higher sintering temperature (approximately 1700° C.). The porosity for the wet samples sintered at approximately 1700° C. have a porosity that is at least 5 times higher than the wet samples sintered at approximately 1600° C. In particular, Sample 11 has a porosity that is approximately 6.9 times higher than the porosity of Sample 10, both of which did not include any added ZnO or MgO. For the MgO-containing wet-milled samples, Sample 15 has a porosity that is approximately 39 times higher than the porosity of Sample 13 (Retest). For the ZnO-containing wet-milled samples, Sample 19 has a porosity that is approximately 39 times higher than the porosity of Sample 18. Note that other samples within each of the three different groups have an even greater difference in porosity at the different sintering temperatures. Dry-milled samples are not sintered at different temperatures, and therefore, the effect of sintering temperature on porosity and density is unknown.

The observations for the Jargal-H™-brand refractory are quite different as compared to the Jargal-M™-brand refractory. The shrinkage during sintering is approximately 16%. Whereas the addition of MgO to the Jargal-M™-brand refractory has lower porosity and higher density, for the Jargal-H™-brand refractory, the opposite effect is seen. In particular, Sample 22 (approximately 1 wt % MgO) has a porosity of approximately 4.00 vol % and a density of 3.05 g/cc. Sample 21 (undoped) has a porosity of approximately 0.39 vol % and a density of 3.23 g/cc. With respect to porosity and density, Sample 23 (approximately 2 wt % ZnO) is between but much closer to Sample 21 as compared to Sample 22. Sample 23 has a porosity of approximately 0.67 vol % and a density of 3.19 g/cc. More samples with Jargal-H™-brand refractory may be tested to determine the effect of sintering temperature (e.g., 1700° C.) and sintering environment (e.g., closed with pieces of Jargal-M™-brand or Jargal-M™-brand refractory) on the porosity and density.

Additional samples 24-27 are formed according to techniques described herein. In particular, samples are prepared by combining powders having the compositions indicated in Table 3. The samples are formed by mixing the beta-alumina powder and the powders of any dopants, such as $Ta_2O_5$, $Y_2O_3$, or ZnO, with water to form a slurry. The beta-alumina powder is previously jet milled, such that the particles have a D50 within a range of approximately 2.9 microns and approximately 3.8 microns. In the case of sample 31, the beta-alumina powder is also wet milled. The slurry is then spray dried with binders and other additives and used to form a green body by isostatic pressing having dimensions of 2×2×5 inches. The green body is then fired in air for approximately 15 days on a suitable cycle and then sintered at a temperature within a range of 1560° C. to 1640° C. for a period within a range of 29 hours to 31 hours. The beta-alumina powder comprising samples 24-27 includes $Al_2O_3$ within a range of approximately 93.2 wt % and approximately 94.4 wt %, $Na_2O$ within a range of approximately 5.3 wt % and approximately 6.5 wt %, $SiO_2$ within a range of approximately 0.07 wt % and approximately 0.13 wt %. In addition, the beta-alumina of samples 24-27 includes a combined content of CaO, MgO, and $Fe_2O_3$ within a range of approximately 1.6 wt % and 2.4 wt %.

TABLE 3

| Sample | Beta-Alumina (wt %) | $Y_2O_3$ (wt %) | ZnO (wt %) | $Ta_2O_5$ (wt %) |
|---|---|---|---|---|
| 24 | 99.01 | — | — | 0.99 |
| 25 | 99.01 | — | 0.99 | — |
| 26 | 99.01 | 0.99 | — | — |
| 27 | 100 | — | — | — |

Table 4 indicates density and porosity data of the samples 24-27 and Table 5 indicates the composition of crystalline phases of portions of samples 24 and 27. The crystalline phase data is obtained using X-ray diffraction techniques. Table 4 indicates that Sample 24, which is prepared with $Ta_2O_5$, is more dense and less porous than samples 25, 26, and 27. Additionally, the data in Table 5 indicates that a reaction layer forms on portions of the respective samples where a portion of the beta-alumina converts to corundum during preparation of the respective samples. The reaction layer is less than approximately 4 mm deep in the portions of samples 24 and 27 being measured. Below the reaction layer, the $Al_2O_3$ of the samples remains in the beta-alumina phase.

Figure 13:
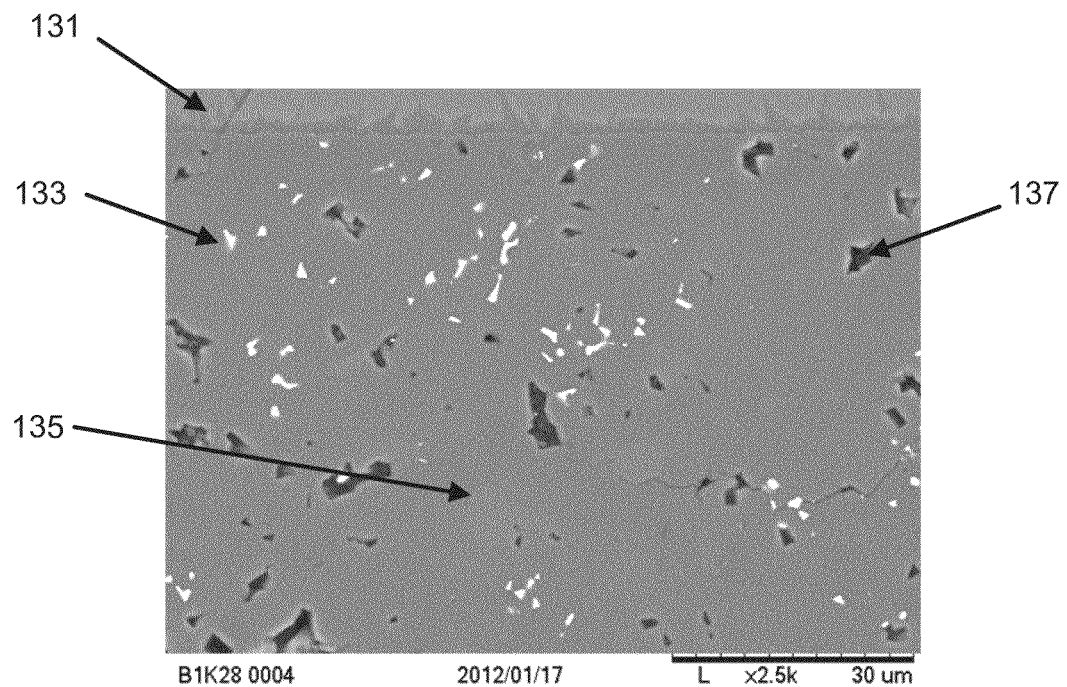
FIG. 13 is an X-ray diffraction image illustrating a cross-sectional view of an interface between a portion of a sample of a beta alumina-containing refractory material and an alkali Al—Mg—Si glass.

FIG. 13 is an X-ray diffraction image illustrating a cross-sectional view of an interface between a portion of a sample having the composition of sample 24 and a portion of an alkali Al—Mg—Si glass 131. $Ta_2O_5$ is illustrated in FIG. 13 as white segments, such as exemplary white segment 133. In the view of the sample shown in FIG. 13, the beta alumina phase 135 did not convert to corundum when exposed to molten alkali Al—Mg—Si glass. Further, a Mg—Al oxide layer is absent from the portion of the sample illustrated in FIG. 13. In addition, FIG. 13 illustrates a number of pores, such as exemplary pore 137.

Figure 14:
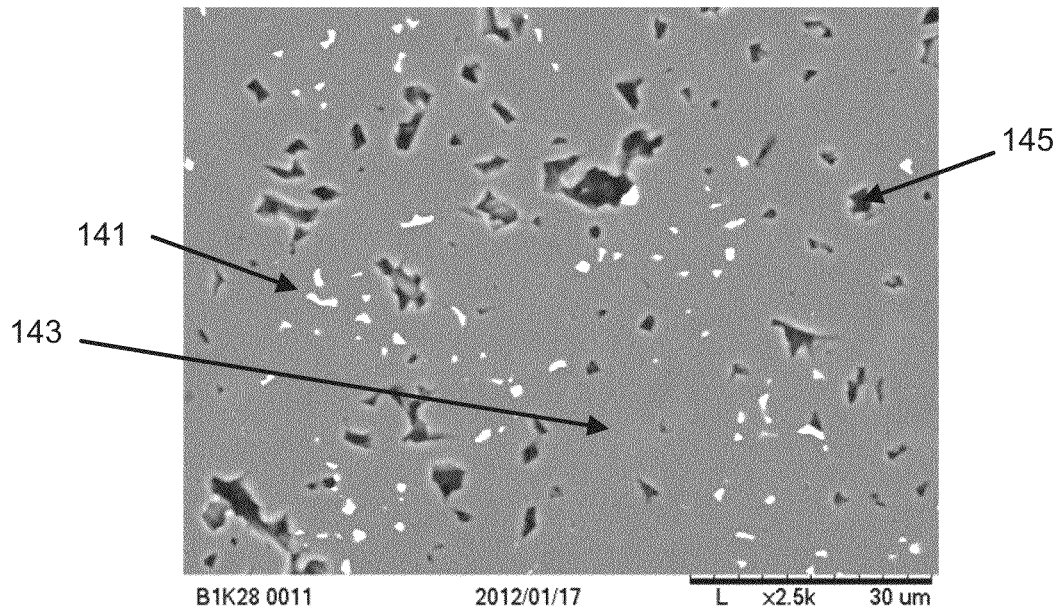
FIG. 14 is an X-ray diffraction image illustrating a cross-sectional view of a portion of the body of the sample of FIG. 13 that is removed from the interface.

FIG. 14 is an X-ray diffraction image illustrating a cross-sectional view of a portion of the body of the sample of FIG. 13. The view of FIG. 14 illustrates a portion of the sample that is set apart from the interface with the Al—Mg—Si glass. The portion of the sample illustrated in FIG. 14 includes segments of $Ta_2O_5$, such as exemplary segment 141, and a beta-alumina phase 143. Additionally, the portion of the sample illustrated in FIG. 14 includes a number of pores, such as exemplary pore 145.

TABLE 4

| Sample | Density (g/cc) | Porosity (vol %) |
|---|---|---|
| 24 | 3.16 | 0.36 |
| 25 | 2.91 | 8.15 |
| 26 | 2.94 | 6.13 |
| 27 | 2.93 | 7.22 |

TABLE 5

| Sample | Center of Sample | Reaction Layer (0-4 mm) | Below Reaction Layer |
|---|---|---|---|
| 24 (vol % corundum) | 0 | 42.3 | 0 |
| 24 (vol % beta alumina) | 100 | 57.7 | 100 |
| 27 (vol % corundum) | 0 | 29.3 | 0 |
| 27 (vol % beta alumina) | 100 | 70.7 | 100 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A refractory object comprising a glass overflow forming block, wherein the forming block comprises $Al_2O_3$, wherein the $Al_2O_3$ comprises alpha-$Al_2O_3$ and beta alumina; wherein at least 75% of the $Al_2O_3$ comprises beta alumina and wherein the refractory object has a porosity of at least approximately 0.1 vol % and no greater than approximately 20 vol %.

2. The refractory object according to claim 1, wherein the forming block comprises a body and a coating along at least a portion of the body, wherein the coating comprises the beta alumina.

3. The refractory object according to claim 2, wherein the coating has a thickness of at least approximately 100 μm and no greater than approximately 5000 μm.

4. The refractory object according to claim 2, wherein the coating includes a plurality of layers.

5. The refractory object according to claim 4, wherein the plurality of layers comprises an inner layer and an outer layer, wherein the inner layer is disposed between the body and the outer layer, and the coefficient of thermal expansion of the inner layer is between the coefficients of thermal expansion of the body and the outer layer.

6. The refractory object according to claim 2, wherein:
the coating has a first surface and a second surface opposite the first surface;
the first surface is closer to the body than the second surface;
the coating has a first alpha-$Al_2O_3$:beta alumina ratio near the first surface and a second alpha-$Al_2O_3$:beta alumina ratio near the second surface; and
the first alpha-$Al_2O_3$:beta alumina ratio is greater than the second alpha-$Al_2O_3$:beta alumina ratio.

7. The refractory object according to claim 6, wherein:
the coating has an intermediate region spaced apart from the first surface and the second surface; and
the intermediate region has an intermediate alpha-$Al_2O_3$:beta alumina ratio that is less than the first alpha-$Al_2O_3$:beta alumina ratio and greater than the second alpha-$Al_2O_3$:beta alumina ratio.

8. The refractory object according to claim 1, wherein the forming block comprises a total $Al_2O_3$ content of at least approximately 80%.

9. The refractory object according to claim 1, wherein the forming block further comprises zircon, mullite, SiC, or any combination thereof.

10. The refractory object according to claim 1, wherein the refractory object includes a first dopant comprising a Group 1 element, a Group 2 element, a rare earth element, Pb, or any combination thereof.

11. The refractory object according to claim 1, wherein the refractory object comprises at least approximately 2.1 mol % and no greater than approximately 26 mol % of a first dopant.

12. The refractory object according to claim 1, wherein the refractory object includes a second dopant that comprises a rare earth element, Ta, Nb, Mg, Zr, Hf, or any combination thereof.

13. The refractory object according to claim 1, wherein the refractory object includes $TiO_2$, CaO, $SiO_2$, $Fe_2O_3$, $Na_2O$, or any combination thereof at a concentration of no greater than approximately 2 wt %.

* * * * *